3,438,572
ADJUSTABLE DUAL PHASE LIQUID FEED MEANS FOR CENTRIFUGAL COUNTERCURRENT EXCHANGE DEVICE
Wladzia G. Podbielniak Doyle and Collin Morley Doyle, both of 21 W. Elm St., Chicago, Ill. 60610
Filed May 25, 1966, Ser. No. 552,753
Int. Cl. B04b 1/12, 11/02, 15/00
U.S. Cl. 233—15                                    7 Claims

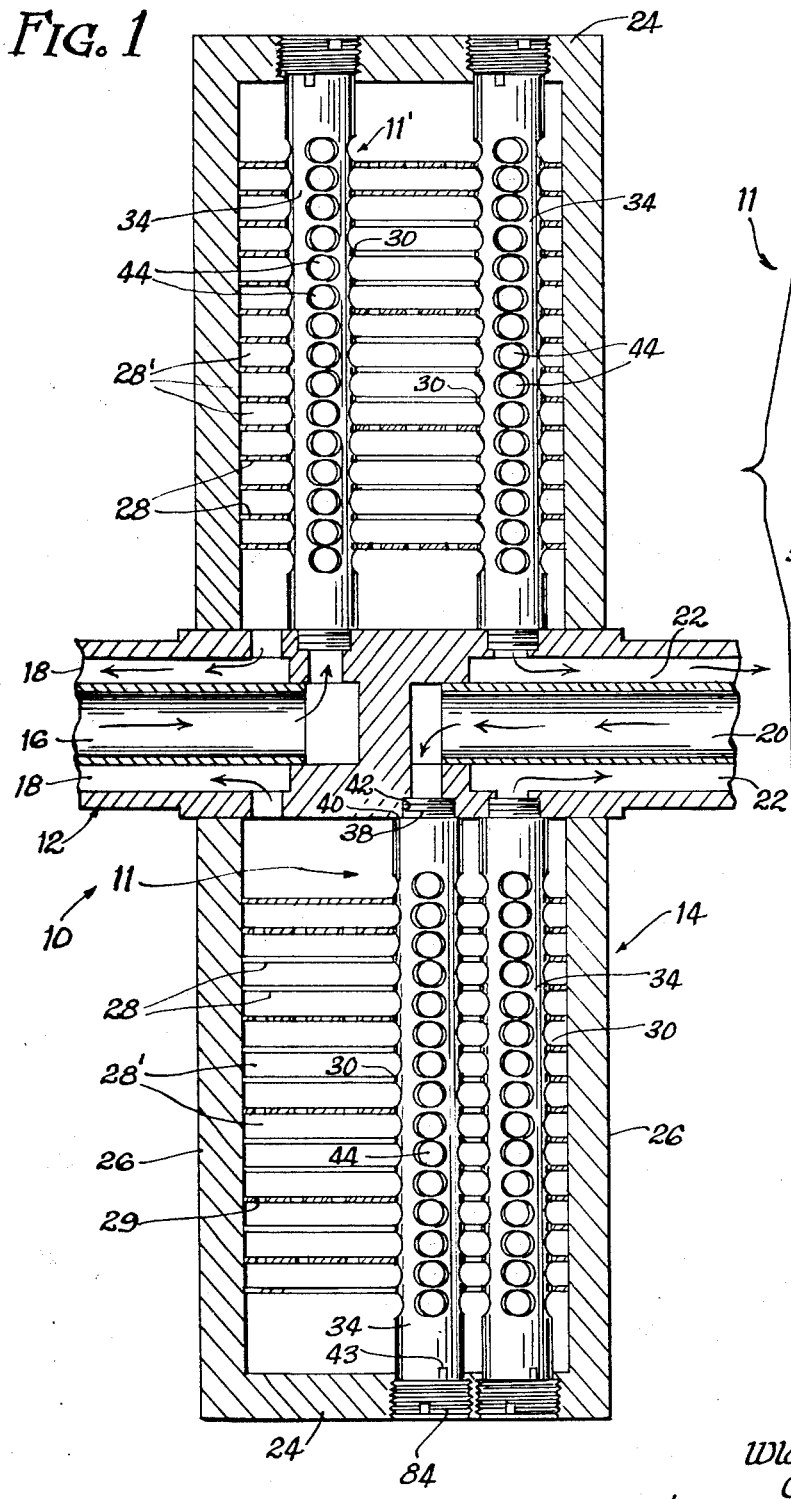
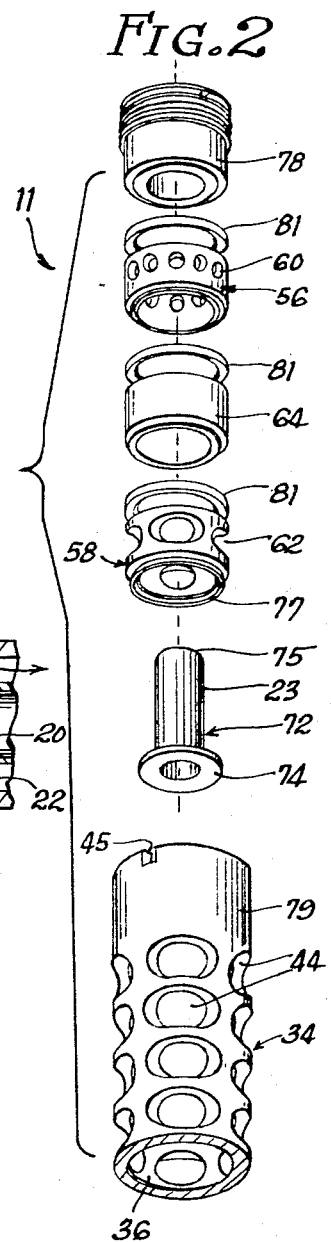
FIG. 1
FIG. 2
INVENTORS
Wladzia G.P. Doyle
Collin M. Doyle
by Eli Mullin Atty

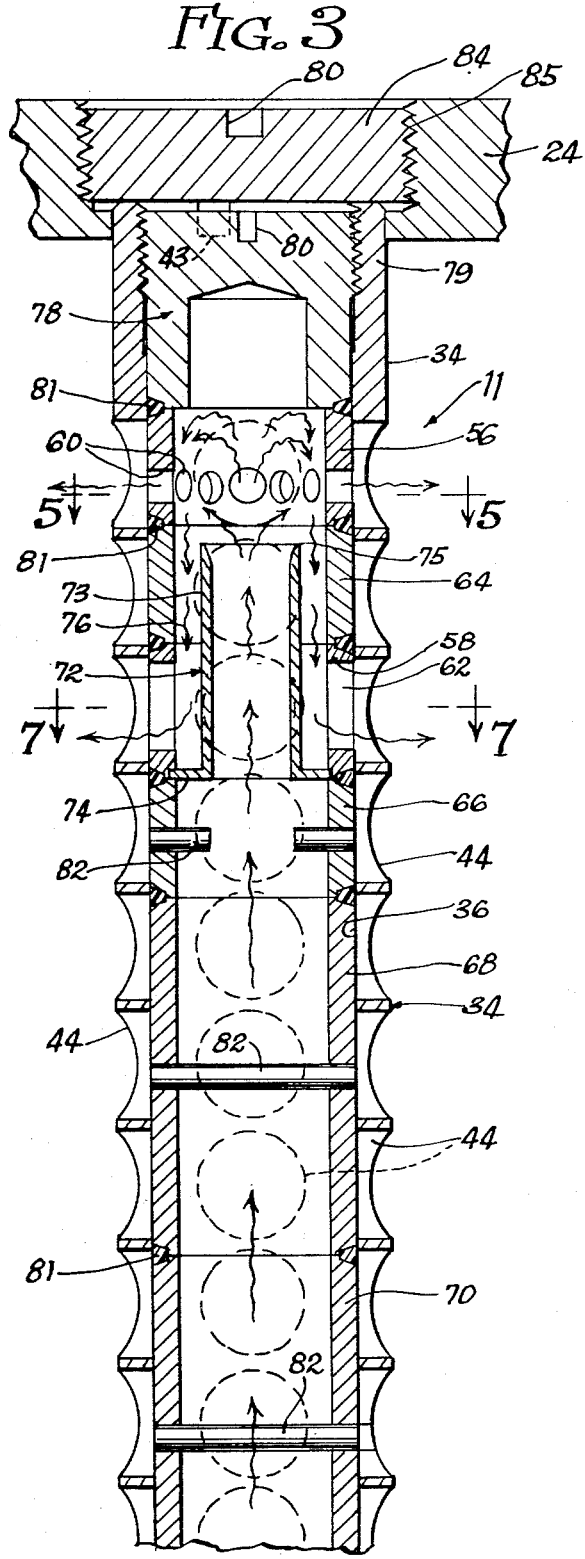
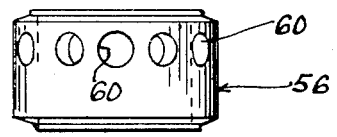
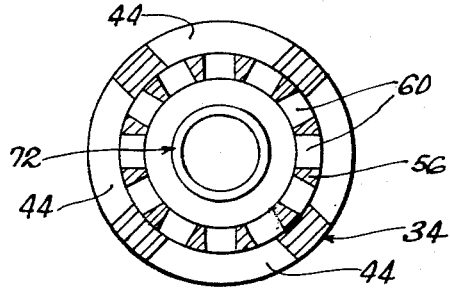
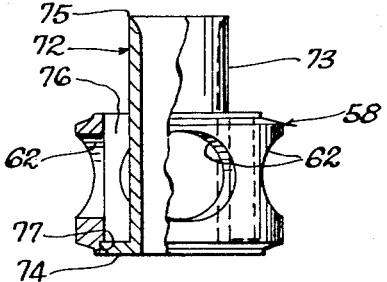
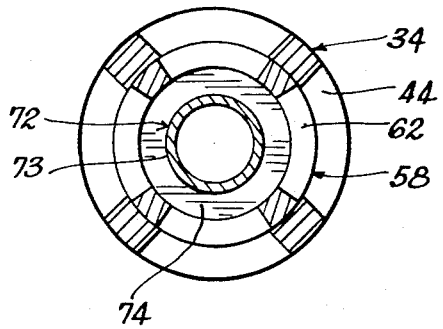
INVENTORS
Wladzia G.P. Doyle
Collin M. Doyle
by Eli Mullin
Atty United States Patent Office 3,438,572
Patented Apr. 15, 1969

ABSTRACT OF THE DISCLOSURE

A fluid feed means for use in centrifugal countercurrent exchange devices wherein means is provided not only for ready disassembly of the device, but also a central conduit is provided in the bore of the device to enhance its utility.

This invention relates generally to a fluid feed means for use in centrifugal countercurrent exchange devices of the type disclosed in the co-pending U.S. Patent application of Collin M. Doyle, entitled Phase Separator Convertor and Adjustable Liquid Feed and Discharge Means for Centrifugal Countercurrent Exchange Devices filed Apr. 25, 1966, under Ser. No. 544,971, U.S. Patent No. 3,292,850. More particularly, the invention relates to a liquid feed means designed so that two liquids may be introduced simultaneously therethrough into a countercurrent exchange device; said feed means including means for readily varying the inlet positions of said liquids and means for optimizing the separation zone of said liquids inside the liquid feed means.

In the countercurrent exchange of two relatively immiscible liquids the main objective is to either extract a desirable or undesirable solute from one of the liquids by the use of an extractive solvent. It has been previously determined that in some countercurrent exchange processes a third liquid introduced into the countercurrent exchange device substantially aids the extraction of the desired solute. For example, in the "phenol-lube oil" process when lubricating oil is extracted with phenol to generate reflux liquid, it is desirable to introduce water as an auxiliary liquid near the point of admission of the oil phase to reduce the solvent power of the phenol.

The centrifugal countercurrent exchange devices of the type described in the aforemention patent application adequately and efficiently provided for the admission of the light principal liquid near the periphery of the rotor and the heavier principal liquid near the axial shaft of the rotor. However, to introduce a third liquid having a lighter or heavier specific gravity than the principal liquids at a predetermined position in the rotor of these devices required a third liquid feed means. The addition of the third liquid feed means also necessitated having a mechanical seal at the junction of the third liquid feed means and the axial shaft of the rotor.

In view of the foregoing, it is therefore a primary object of this invention to provide a single fluid feed means for a countercurrent exchange device which permits the introdudction of a light fluid phase and a heavier fluid phase at predetermined spaced positions in the rotor.

It is another primary obect to provide a feed means for a countercurrent exchange device which includes means for varying the respective inlet positions of a light fluid phase and a heavier fluid phase. It is a related object to provide a fluid feed means for a countercurrent exchange device which includes a fine adjust means to optimize the inlet position into the device of at least one of the fluid phases.

It is another object to provide a liquid feed means which includes means for optimizing the zone of separation of liquids from a mixture having a light phase and a heavier liquid phase.

In accordance with the stated objects, an embodiment of the invention comprises a liquid feed means including briefly a liquid distribution tube which extends from the axial shaft to the periphery of the rotor. The tube includes a plurality of sets of longitudinally spaced openings formed therein. Removably positioned in an end-to-end relationship within the tube are a predetermined number of individual sleeves. Two of the sleeves are selector sleeves and include circumferentially spaced selector openings formed therein. The other sleeves are hollow and imperforate. Due to the geometric relationship between the sleeves and a length of the bore within the liquid distribution tube, the sleeves are selectively arranged so that the selector openings of the selector sleeves are in registry with longitudinally spaced apart sets of openings in the liquid distribution tube. These spaced apart aligned openings provide respectively the inlet positions for the light phase and the heavier phase liquids after the same have separated from a mixture flowing within the liquid feed means.

It is therefore a primary feature of this invention to provide a liquid feed means for a countercurrent exchange device comprising a pair of selector sleeves with each having at least one selector opening formed therein and the longitudinal positions of the selector sleeves within the feed means being conveniently adjustable to vary respectively the input positions into the rotor of a light liquid phase and a heavier liquid phase.

It is another feature to include a conduit within a liquid feed means to provide a pathway for a mixture of a light liquid phase and a heavier liquid phase to the zone of liquid separation inside the liquid feed means. The separated heavier liquid phase is introduced into the rotor via the selector sleeve positioned nearest the rotor periphery, whereas the separated light liquid phase is introduced into the rotor via the selector sleeve positioned nearest the axial shaft of the rotor.

A feature related to the last mentioned feature is to provide a liquid feed means which is adaptable to permit the length of the conduit to be conveniently varied in order to more precisely convey the mixture of the light and heavier phase liquids to the level of liquid separation inside the liquid feed means and thereby optimize the liquid separation zone.

Still another feature is to provide a selector sleeve having a plurality of apertures circumferentially spaced therearound and positioned closer to one end than to the other end thereof. With the apertures formed in this manner, the inverting of the selector sleeve enables the liquid input into the rotor to be varied from one radial level to another for the same longitudinal position of the selector sleeve within the liquid feed means. A related feature is to dimension the size of the apertures formed in the selector sleeve in relation to the openings of the liquid distribution tube so as to provide two inlet positions at different radial levels for the same opening of the liquid distribution tube.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages and features should be readily understood and appreciated.

Referring to the drawings in which the same character of reference are employed to indicate corresponding or similar parts throughout the several figures of the drawings:

FIG. 1 is a fragmentary sectional view of a centrifugal countercurrent exchange device incorporating therein the dual phase adjustable liquid feed means embodying the principles of the invention;

FIG. 2 is an exploded perspective view of the primary component parts of the dual phase liquid feed means;

FIG. 3 is a fragmentary cross-sectional view of the dual phase liquid feed means illustrating the parts and their cooperation whereby the introduction into the rotor of the light and heavier liquid phases is accomplished;

FIG. 4 is a front elevational view of the heavier phase selector sleeve of the liquid feed means of FIG. 3;

FIG. 5 is a cross sectional view taken substantially on the plane of the line 5—5 in FIG. 3, and viewed in the direction indicated;

FIG. 6 is a front elevational view, partly in cross-section, of the conduit positioned in the light phase selector sleeve of the liquid feed means of FIG. 3; and FIG. 7 is a cross-sectional view taken substantially on the plane of the line 7—7 in FIG. 3, and viewed in the direction indicated.

Referring more particularly to FIG. 1 of the drawings, the reference numeral 10 indicates generally a centrifugal countercurrent exchange device in which is incorporated the dual phase adjustable fluid or liquid feed means 11 embodying the principles of this invention. Since the basic device 10 is generally of the type described in the aforementioned co-pending application, only so much thereof as is necessary for an understanding of the present invention will be described in detail. The device 10 thus comprises an axial shaft 12 journalled for rotation in a suitable supporting structure. A drum or rotor 14 is rigidly connected to the shaft 12 for rotation therewith.

Suitable passageways such as 16 and 18 are provided in the shaft 12 for respectively supplying the heavier principal liquid to the rotor 14 and removing the light separated liquids therefrom. Similarly, suitable passageways such as 20 and 22 are provided for respectively supplying the light principal liquid to the rotor 14 and removing the heavier separated liquids therefrom. An auxiliary or third phase liquid may be admixed with either the light or heavier principal liquids prior to their introduction into the dual phase input means 11. Hence, either passageway 16 or 20 may be used to convey the auxiliary liquid into the device and either passageway 18 or 22 may serve to conduct the auxiliary liquid out from the device.

The rotor 14 comprises a cylindrical outer wall 24 and a pair of end plates 26, 26. Mounted between end plates 26 is a plurality of spaced apart separator walls or bands 28 which may be arranged either concentrically or as a continuous spiral, in the well known manner, said bands 28 define a plurality of spaced apart liquid contacting chambers 28'. The bands 28 are formed with a plurality of perforations 29 therethrough, said perforations may be of the adjustable type if desired. The bands 28 also include larger holes which are aligned and arranged to afford a plurality of radially extending cavities 30. One of these radially extending cavities 30 accommodates the dual phase adjustable liquid feed means 11 (FIGS. 1 and 3) through which a principal liquid and an auxiliary liquid may be introduced into the rotor. Another of these cavities 30 accommodates an input means 11' through which the other principal fluid may be introduced into the rotor (FIG. 1).

The adjustable dual phase liquid feed means 11 comprises a fluid or liquid distribution tube 34 having an internal bore 36. Tube 34 terminates at one end thereof in a reduced diameter portion 38, thereby affording a shoulder 40 which abuts against the shaft 12. Reduced diameter portion 38 is externally threaded for cooperation with a suitable internally threaded hole 42 formed in the rotor shaft 12 of the rotor 14 and in communication, as shown in FIG. 1, with the passageway 20 in shaft 12. A pair of opposed notches 43 are formed at the opposite or outermost ends of tube 34 (only one shown in the drawing) when it is desired to remove tube 34 from the rotor 12.

Formed in tube 34 are a plurality of longitudinally spaced apart rows of openings 44. The openings 44 of each row are spaced circumferentially around tube 34. The defining edges of openings 44 of tube 34 may as shown, flare outwardly from the inner surface of the tube 34 to the outer surface thereof to provide the desired spray characteristics for the liquids being introduced into the rotor.

Removably positioned within tube 34 in an end-to-end relationship is a plurality of sleeves having outer diameters substantially equal to the diameter of the tube bore 36 to permit the sleeves to be slidably inserted therein. The sleeves include an outer liquid phase selector sleeve 56 and an inner liquid phase selector sleeve 58 which is operatively positioned closer to shaft 12 than the outer selector sleeve 56. All of the sleeves except the selector sleeves 56, 58 are solid-walled or imperforate. The selector sleeves 56, 58 are provided respectively with sets of circumferentially spaced openings 60, 62. As described in said prior patent application. Ser. No. 544,971, the number of sleeves varies in accordance with the number of liquid inlet positions or sets of openings 44 formed within the tube 34. Hence, the cooperation of the selector sleeves 56, 58 with the solid-walled sleeves enables the sets of openings 60, 62 respectively of the selector sleeves 56, 58 to be positioned within the liquid distribution tube 34 in registry with any preselected spaced apart rows of openings 44 in tube 34, to provide the inlets into the rotor 14 for the light liquid phase and a heavier liquid phase from the same liquid feed means 11. In the illustrated embodiment shown in FIG. 3, an imperforate sleeve 64 is positioned between selector sleeves 56, 58 and imperforate sleeves 66, 68, 70 and the other imperforate sleeves not shown are in end-to-end relationship below the inner selector sleeve 58 to provide the necessary support for the tight fit of the sleeves. Thus, the selector openings 60, 62 of the outer and inner selector sleeves, 56, 58 respectively are aligned with the first and third outermost rows of openings 44 of the liquid distribution tube 34.

A hollow conduit 72 comprising a tubular portion 73 having a circular collar 74 at one end thereof is removably positioned through the inner selector sleeve 58. The other or outermost end 75 of conduit 72 extends to a predetermined radial level adjacent the separation zone for the mixture of liquids flowing through feed means 11 from passageway 20. As shown in FIG. 3, outermost end 75 of conduit 72 extends to a level just below the selector sleeve 56. The outside surface of tubular portion 73 and the spaced apart opposed inside surfaces of selector sleeve 56 and sleeve 64 define an annular channel 76 therebetween, the purpose of which will be explained in detail below.

The collar 74 of conduit 72 seats within an accommodating recess 77 (FIG. 2) at the end of the inner selector sleeve 58 nearest the shaft 12 (see FIG. 3). The depth of recess 77 and the thickness of collar 75 are substantially identical to afford an even surface when seated one within the other. Thus, the end of imperforate sleeve 66 immediately below the selector sleeve 58 abuts against the inner end of selector sleeve 58 and also the periphery of the collar 75 of conduit 72 to tightly and securely maintain both in place.

Completing the structure of the dual phase fluid feed means 11 is a sealing plug 78 (see FIG. 3) which bears against the outermost sleeve. The upper portion of plug 78 is externally threaded to engage the internally threaded upper end 79 of tube 34. The top end of the sealing plug 78 includes a tool engaging recess 80.

As shown in FIG. 3, a gasket 81 is positioned between the ends of each two adjacent sleeves and between sealing plug 78 and the outer selector sleeve 56. Thus, when the component parts are operatively in place within the dual phase liquid feeds 11, a liquid-tight relationship is maintained save for the aligned longitudinally spaced apart openings 44 of the tube 34 with the openings 60, 62 of selector sleeves 56, 58.

In order to facilitate the manipulation of the sleeves, each of them is provided with a fine cross wire 82 (FIG. 3) which may be engaged by a simple hooked instrument. An external threaded closure plug 84 is threadedly associated with a suitable internally-threaded hole 85 within the outer wall 24 of rotor 14 to maintain the dual phase liquid feed means securely in place between shaft 12 and the rotor periphery.

Turning now particularly to FIGS. 1 and 3, the operation of the dual phase liquid feed means 11 will be described. For the illustrated embodiment, a light principal liquid is admixed with a heavier auxiliary liquid in the desired proportion at a pump located on the outside of the exchange device and the mixture, which may be in the form of a dispersion, is caused to flow through passageway 20 within shaft 12 and into the adjustable dual phase liquid feed means 11. The entire mixture which enters feed means 11 flows through conduit 72 toward the periphery of the rotor. Since the centrifugal force agitates the mixture within the feed means 11 in exactly the same manner as if the mixture were within the rotor, the light principal liquid and the heavier auxiliary liquid separate from the mixture and the heavier liquid flows outward toward the rotor periphery whereas the light liquid flows inward toward the shaft 12. The separated heavier auxiliary liquid is emitted from the dual phase liquid feed means 11 via the selector openings 60 of the outer selector sleeve 56. The separated light principal liquid flows within annular channel 76 toward the inner selector sleeve 58 to be emitted into the rotor via selector openings 62. It should be particularly noted that the collar 74 and the outside wall of the tubular portion 73 of conduit 72 isolate the light principal liquid from the admixed liquids flowing through conduit 72. This enables feed means 11 to function efficiently as a separating chamber.

The length of the tubular portion 73 of conduit 72 may be varied to optimize the efficiency of the separation of the liquids from the mixture flowing within feed means 11 and to control the size of the separation zone of the liquids. Hence, if the spaced apart distance between the selector sleeve 56, 58 is increased or decreased from that shown in FIG. 3, the length of the tubular portion 73 is corespondingly varied so that the outer end thereof is positioned adjacent the new zone of liquid separation within feed means 11. Therefore, by designing the removable conduit 72 to cooperate with the removable sleeves, the zone of liquid separation is optimized by replacing conduit 72 with another having either a longer or shorter tubular portion 73, as determined by the properties of the fluids or liquids being separated.

As shown in FIGS. 3 and 4, the selector openings 60 of the outer selector sleeve 56 are formed closer to one end than to the other end thereof. With the selector openings positioned in this manner, the same selector sleeve has the capability to provide two radial levels of liquid efflux into the rotor for the same longitudinal position of the selector sleeve within the liquid distribution tube 34. Hence, there is one liquid output radial level when the selector sleeve 56 is positioned as in FIG. 3, and another output radial level when the selector sleeve is inverted to the position shown in FIG. 4. It should be further noted that the size of the selector openings 60 are dimensioned substantially smaller than openings 44 of tube 34. Thus, as may be observed by viewing FIG. 3, the selector sleeve 56 affords two radial levels of liquid output for a single row of openings 44 of the liquid distribution tube 34. A further advantage for dimensioning the openings 60 in the selector sleeve 56 smaller than the openings 44 of the distribution tube 34 is to afford a means for slowing the speed of liquid efflux from the liquid feed means 11, thereby providing additional time for the separation of the liquids from the mixture. To be able to control the speed of liquid efflux into the rotor is especially advantageous at points adjacent the rotor periphery where the greatest centrifugal force is present. Hence, as shown in FIG. 3, the outermost selector sleeve 56 includes the smaller sized openings. Although only selector sleeve 56 is shown having the selector openings formed closer to one end than to the other end thereof and of substantially smaller size than tube opening 44, the inner selector sleeve 58 may also be formed in the same manner.

The use of the dual phase fluid feed means 11 of the present invention is particularly suitable, for example, in the "phenol-lube oil" process. In this process, dispersion of oil, the light principal liquid, and water, the auxiliary liquid, is piped into the dual phase feed means 11 from the passageway 20. The heavier principal liquid phenol, acting as the selector solvent is piped into passageway 16 and communicates with the input means 11' (FIG. 1) and introduced therefrom into the rotor at a predetermined radial level. The oil and water dispersion flows radially outward through feed means 11 and passes through conduit 72 as shown in FIG. 3. Immediately after passing through the outer end 75 of conduit 72, the oil and water separate due to the centrifugal force of the system. The light oil phase flows inward through the annular channel 76 and is introduced into a predetermined contacting compartment within the rotor via selector openings 62 of selector sleeve 58. The heavier water phase flows into another predetermined contacting chamber within the rotor via selector openings 60 of selector sleeve 56. The oil phase is isolated from the dispersion of oil and water by the collar 74 and the outside wall of conduit 72. If it is desired to introduce an auxiliary liquid with the heavier principal liquid, the same would be mixed together and caused to flow through passageway 16 within shaft 12 to a communicating adjustable dual phase feed means 11.

From the foregoing description and drawings, it should be apparent that a novel, dual phase, fluid feed means has been provided for countercurrent exchange devices to enable a light fluid phase and a heavier fluid phase to be selectively introduced from a common feed means at spaced apart positions throughout the radial length of the device. The geometric relationship of a plurality of sleeves including a first and second selector sleeve positioned within a perforated distribution tube permits the spaced apart fluid inlet positions into the rotor respectively of a light and heavier fluid phase to be accurately preset. The cooperation of the conduit 72 removably positioned inside the dual phase fluid feed means substantially isolates the mixture introduced into the fluid feed means from the separated fluids. Moreover, the complete interchangeability of the plurality of sleeves and the cooperation of the conduit 72 with the sleeves permit the length of conduit 72 and/or the radial position of the same to be varied, thereby enabling the mixture of a principal and auxiliary fluid to be conveyed more accurately to the radial level of fluid separation inside the dual phase fluid feed means 11.

It is believed that our invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the

What we claim and desire to secure by Letters Patent of the United States is:

1. In a centrifugal countercurrent exchange device for the countercurrent exchange of a plurality of fluids including a light principal fluid and a heavier fluid comprising: a rotor having an aixal shaft mounted for rotation, a plurality of radially spaced separator bands positioned in said rotor and defining radially extending fluid contacting chambers, openings in said bands intercommunicating said chambers, a first means for conveying a mixture of one of said principal fluids and an auxiliary fluid, said principal fluid and said auxiliary fluid varying in specific gravity, a second means for conveying the other of said principal fluids into said rotor, a plurality of passageways for removing the separated principal and auxiliary fluids of the mixture, and a dual phase fluid feed means positioned between the shaft and the periphery of the rotor and in communication with said first means, said mixture of the principal fluid and the auxiliary fluid flowing into said dual phase feed means and the principal fluid and auxiliary fluid of the mixture being separated therein by centrifugal force, said dual phase fluid feed means comprising:

an elongated tube having a plurality of longitudinally spaced apart openings formed therein; and a plurality of sleeves removably positioned in an end-to-end relationship within said tube, said sleeves including a first selector sleeve and a second selector sleeve and each of the selector sleeves having at least one selector opening formed therein, said sleeves being arrangeable within said tube so that the selector openings of said first and second selector sleeves are in registry respectively with predetermined longitudinally spaced apart openings of the tube to provide outlets into the rotor from the feed means respectively for the separated principal and auxiliary fluids;

wherein at least one of said selector sleeves has said selector opening formed closer to one end than to the other end thereof, whereby said selector sleeve may be positioned to selectively provide either of two levels of liquid outlet for the same longitudinal position of said last-mentioned selector sleeve within said distribution tube, and wherein the opening in said last-mentioned selector sleeve is substantially smaller than the openings of the tube whereby said selector sleeve may be positioned to provide either of the two levels of liquid outlet through the same tube opening.

2. In a centrifugal countercurrent exchange device for the countercurrent exchange of a plurality of fluids including a light principal fluid and a heavier fluid comprising: a rotor having an aixal shaft mounted for rotation, a plurality of radially spaced separator bands positioned in said rotor and defining radially extending fluid contacting chambers, openings in said bands intercommunicating said chambers, a first means for conveying a mixture of one of said principal fluids and an auxiliary fluid, said principal fluid and said auxiliary fluid varying in specific gravity, a second means for conveying the other of said principal fluids into said rotor, a plurality of passageways for removing the separated principal and auxiliary fluids of the mixture, and a dual phase fluid feed means positioned between the shaft and the periphery of the rotor and in communication with said first means, said mixture of the principal fluid and the auxiliary fluid flowing into said dual phase feed means and the principal fluid and auxiliary fluid of the mixture being separated therein by centrifugal force, said dual phase fluid feed means comprising:

an elongated tube having a plurality of longitudinally spaced apart openings formed therein; and a plurality of sleeves removably positioned in an end-to-end relationship within said tube, said sleeves including a first selector sleeve and a second selector sleeve and each of the selector sleeves having at least one selector opening formed therein, said sleeves being arrangeable within said tube so that the selector openings of said first and second selector sleeves are in registry respectively with predetermined longitudinally spaced apart openings of the tube to provide outlets into the rotor from the feed means respectively for the separated principal and auxiliary fluids;

wherein a conduit is removably positioned between the extreme spaced apart ends of the selector sleeves to provide a passage for the mixture to a level adjacent the centrifugal separation zone for said mixture, the mixture flowing through said conduit being substantially isolated from at least one of the separated liquids of the mixture; and wherein said first selector sleeve is positioned nearer the axial shaft of the rotor than the second selector sleeve; and said conduit comprises a hollow substantially tubular portion and a collar encircling one end of the tubular portion, said tubular portion positioned within at least said first selector sleeve and extending toward the second selector sleeve, said collar being removably positioned in tight contact between an end of one of the sleeves and another surface.

3. A centrifugal device as claimed in claim 2, wherein:

at least one end of said first selector sleeve is recessed to accommodate the collar of said conduit, thereby enabling the collar and the recessed end to present a substantially even contacting surface with the surface adjacent said recessed end of the selector sleeve.

4. A centrifugal exchange device as claimed in claim 2, wherein said conduit is substantially tubular shaped and is spaced apart from an opposed inside surface of at least one of said sleeves to define an annular channel therebetween, one of said separated liquids flowing within said channel toward the opening of one of said selector sleeves.

5. A centrifugal exchange device as claimed in claim 2, wherein:

said first selector sleeve is nearer the axial shaft than the second selector sleeve;

said conduit comprises a tubular portion and a collar encircling the end of the tubular portion nearest the shaft, said tubular portion being operatively positioned in spaced relationship with the inside surface of at least said first selector sleeve to define a substantially annular channel therebetween, the outer end of said tubular portion being adjacent the openings of the second selector sleeve, said collar being in tight frictional contact with the end of the first selector sleeve nearest the shaft and another surface, the mixture of the principal liquid and the auxiliary liquid flowing into the feed means and through the conduit, the principal and auxiliary fluids of said mixture separating upon being ejected from the outer end of the conduit and the heavier separated fluid being introduced into the rotor via the opening of the second selector sleeve and the light fluid flowing within said channel to be introduced into the rotor via the opening of the first selector sleeve.

6. A centrifugal exchange device as claimed in claim 5, wherein:

the end of the selector sleeve nearest the shaft is recessed to accommodate the collar of the conduit; and at least the selector opening of the second selector sleeve is substantially smaller than the opening of the tube and thereby delaying the time of liquid efflux from the feed means after the fluids of the mixture have separated.

7. A centrifugal exchange device as claimed in claim 6, wherein the opening of said second selector sleeve is positioned closer to one end than to the other end thereof to provide two radial levels of fluid efflux into the rotor for the same longitudinal position of the second selector sleeve.

References Cited

UNITED STATES PATENTS 3,221,985 12/1965 Burdett _____ 233—15
3,292,850 12/1966 Doyle _____ 233—15

HENRY T. KLINKSIEK, *Primary Examiner.*